(12) United States Patent
Schlesinger et al.

(10) Patent No.: US 11,685,248 B2
(45) Date of Patent: Jun. 27, 2023

(54) CENTRAL CONNECTOR FOR VEHICLES HAVING A HIGH-VOLTAGE ACCUMULATOR

(71) Applicant: Bayerische Motoren Werke Aktiengesellschaft, Munich (DE)

(72) Inventors: Benjamin Schlesinger, Garching (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 17/048,520

(22) PCT Filed: Apr. 12, 2019

(86) PCT No.: PCT/EP2019/059371
§ 371 (c)(1),
(2) Date: Oct. 16, 2020

(87) PCT Pub. No.: WO2019/211078
PCT Pub. Date: Nov. 7, 2019

(65) Prior Publication Data
US 2021/0370755 A1 Dec. 2, 2021

(30) Foreign Application Priority Data
May 3, 2018 (DE) ............ 10 2018 206 836.4

(51) Int. Cl.
*B60K 1/04* (2019.01)
*F16F 15/02* (2006.01)
*B60L 50/90* (2019.01)

(52) U.S. Cl.
CPC .......... *B60K 1/04* (2013.01); *B60L 50/90* (2019.02); *F16F 15/022* (2013.01); *B60K 2001/0438* (2013.01)

(58) Field of Classification Search
None
See application file for complete search history.

(56) References Cited

U.S. PATENT DOCUMENTS

| 9,884,545 B1 | 2/2018 | Addanki et al. |
| 11,034,248 B2 | 6/2021 | Ohkuma |
| 2012/0040219 A1 | 2/2012 | Cappellotti et al. |

(Continued)

FOREIGN PATENT DOCUMENTS

| CN | 102320234 A | 1/2012 |
| CN | 102320234 B | 8/2013 |

(Continued)

OTHER PUBLICATIONS

United States Non-Final Office Action issued in U.S. Appl. No. 17/048,528 dated May 18, 2022 (14 pages).

(Continued)

*Primary Examiner* — Katy M Ebner
(74) *Attorney, Agent, or Firm* — Crowell & Moring LLP

(57) ABSTRACT

A vehicle has a body, a high-voltage accumulator that is mounted on the body by fastening elements, and at least one central connector which differs from the fastening elements and is designed to support the body on the high-voltage accumulator. The central connector is in the form of a hydraulic bearing that extends between the body and the high-voltage accumulator.

15 Claims, 2 Drawing Sheets

(56) References Cited

U.S. PATENT DOCUMENTS

| | | | | |
|---|---|---|---|---|
| 2012/0292837 | A1* | 11/2012 | Hettler | F16F 13/18 |
| | | | | 267/140.11 |
| 2014/0001685 | A1* | 1/2014 | Kim | F16F 13/105 |
| | | | | 267/140.13 |
| 2014/0326524 | A1 | 11/2014 | Ogushi et al. | |
| 2016/0327116 | A1* | 11/2016 | Kim | F16F 13/266 |
| 2017/0066313 | A1 | 3/2017 | Shirai et al. | |
| 2017/0210218 | A1 | 7/2017 | Schmalzrieth et al. | |
| 2018/0051769 | A1* | 2/2018 | Kim | F16F 13/106 |
| 2018/0162212 | A1* | 6/2018 | Kim | F16F 13/101 |
| 2018/0238413 | A1* | 8/2018 | Brown | B60G 13/003 |
| 2018/0320753 | A1* | 11/2018 | Beckmann | B60K 5/1208 |
| 2019/0128363 | A1* | 5/2019 | Kim | F16H 57/025 |
| 2019/0207181 | A1 | 7/2019 | Raepple | |
| 2020/0009957 | A1* | 1/2020 | Grosse | B60K 1/04 |
| 2020/0182328 | A1* | 6/2020 | Lünebach | F16F 13/262 |
| 2021/0095737 | A1* | 4/2021 | Oblizajek | B60K 5/1283 |
| 2021/0163076 | A1* | 6/2021 | Schlesinger | B60K 1/04 |
| 2021/0206252 | A1* | 7/2021 | Ben Salah | B60K 1/04 |
| 2021/0370755 | A1* | 12/2021 | Schlesinger | F16F 15/022 |
| 2022/0016965 | A1* | 1/2022 | Schlesinger | H01M 50/262 |

FOREIGN PATENT DOCUMENTS

| | | | |
|---|---|---|---|
| DE | 10 2011 083 889 A1 | | 4/2013 |
| DE | 10 2012 200 350 A1 | | 7/2013 |
| DE | 10 2016 000 669 B3 | | 1/2017 |
| DE | 10 2016 113 877 A1 | | 3/2017 |
| DE | 10 2016 206 177 A1 | | 10/2017 |
| DE | 102016206177 A1 | * | 10/2017 |
| DE | 10 2016 219 242 A1 | | 4/2018 |
| ER | 0 995 927 A2 | | 4/2000 |
| JP | 2002-235801 A | | 8/2002 |
| JP | 2010-111302 A | | 5/2010 |
| WO | WO-2007065761 A1 | * | 6/2007 ............ F16F 13/103 |
| WO | WO 2017/134081 A1 | | 8/2017 |

OTHER PUBLICATIONS

International Search Report (PCT/ISA/210) issued in PCT Application No. PCT/EP2019/059371 dated Aug. 19, 2019 with English translation (six pages).

German-language Written Opinion (PCT/ISA/237) issued in PCT Application No. PCT/EP2019/059371 dated Aug. 19, 2019 (five pages).

German-language Search Report issued in German Application No. 10 2018 206 836.4 dated Feb. 5, 2019 with partial English translation (12 pages).

International Search Report (PCT/ISA/210) issued in PCT Application No. PCT/EP2019/059381 dated Jul. 25, 2019 with English translation (six pages).

German-language Written Opinion (PCT/ISA/237) issued in PCT Application No. PCT/EP2019/059381 dated Jul. 25, 2019 (six pages).

German-language Search Report issued in German Application No. 10 2018 206 837.2 dated Feb. 5, 2019 with partial English translation (12 pages).

English translation of Chinese-language Office Action issued in Chinese Application No. 201980028212.1 dated Oct. 8, 2022 (eight (8) pages).

English translation of Office Action issued in Chinese Application No. 201980028212.1 dated Dec. 26, 2022 (six (6) pages).

English translation of Chinese Office Action issued in Chinese Application No. 201980028212.1 dated Mar. 14, 2023 (seven (7) pages).

* cited by examiner

CENTRAL CONNECTOR FOR VEHICLES HAVING A HIGH-VOLTAGE ACCUMULATOR

BACKGROUND AND SUMMARY OF THE INVENTION

The present invention relates to a vehicle in which a high-voltage accumulator is connected to the body in an optimal manner by way of a central connector.

Electric vehicles or plug-in hybrids are known from the prior art. Such vehicles require a high-voltage accumulator for accumulating energy which can be provided for driving the vehicle. Such high-voltage accumulators are in most instances disposed in the region of the underbody of the vehicle. Since high-voltage accumulators are typically a voluminous contiguous element, a corresponding cutout from the body is required.

In order for the high-voltage accumulator to be fastened to the body, the peripheral regions of the high-voltage accumulator are in particular fixedly screwed or riveted to the body. Moreover, a central connection between the high-voltage accumulator and the body is established. On account thereof, the body in the direction of a vertical axis of the vehicle can be supported on an external wall of the high-voltage accumulator. Various connection techniques, for example screw-fitting, bracing, or adhesive bonding are known for these central connections.

A relative movement between the body and the high-voltage accumulator typically has to be taken into account at the position of the central connector. This movement has to be absorbed or dampened by the body and the lateral wall of the high-voltage accumulator.

It is an object of the invention to provide a vehicle having a high-voltage accumulator, the vehicle while providing a simple and cost-effective construction and assembly enabling a secure and reliable linkage of the high-voltage accumulator to a body of the vehicle.

The object is achieved by the features of the independent claims. The dependent claims include preferred refinements of the invention.

The object is thus achieved by a vehicle which comprises a body and a high-voltage accumulator. The high-voltage accumulator is attached to the body by way of fastening elements. The high-voltage accumulator is in particular connected to the body by way of the fastening elements in peripheral regions. The fastening elements comprise in particular screws and/or rivets for fastening the high-voltage accumulator to the body. Fixed linking of the high-voltage accumulator to the body thus takes place in particular by way of the fastening elements. Additionally, at least one central connector which differs from the fastening elements is provided. The central connector is configured for supporting the body on the high-voltage accumulator. The supporting action takes place in particular in a manner parallel to a vertical axis of the vehicle. It is thus provided that a reinforcement of the body is achieved by connecting the body and an external wall of the high-voltage accumulator. The central connector is in particular a hydraulic mount which extends between the body and the high-voltage accumulator. The hydraulic mount particularly advantageously extends from an upper side of the high-voltage accumulator to a lower side of the body. A compensation of tolerances between the high-voltage accumulator and the body, on the one hand, and damping of relative movements between the high-voltage accumulator and the body, on the other hand, is enabled on account of the use of a hydraulic mount. The damping of movements takes place in particular along the axis along which the hydraulic mount extends between the high-voltage accumulator and the body. This axis is in particular parallel to the vertical axis of the vehicle. The damping takes place in particular in a such a manner that a fluid, in particular an oil, is pumped from a first chamber to a second chamber in a relative movement between the body and the high-voltage accumulator, wherein a flow-restricting element is disposed between the first chamber and the second chamber. Stresses which are to be absorbed by the high-voltage accumulator are reduced on account of the damping of relative movements. A reinforcement of the body can thus be achieved, on the one hand, and excessive stress on the high-voltage accumulator is prevented, on the other hand.

It is advantageously provided that the central connector is disposed on a largest external face of the high-voltage accumulator. The central connector is particular disposed so as to be centric on a largest external face of the high-voltage accumulator. If a plurality of external faces of the high-voltage accumulator are of identical size and larger than the other external faces, it is thus provided in particular that the central connector is disposed on one of the largest external faces. The high-voltage accumulator is preferably configured so as to be cuboid. The high-voltage accumulator thus has two largest external faces, wherein these largest external faces are oriented in particular so as to be perpendicular to the vertical axis of the vehicle. The central connector is attached to an upper one of these external faces and thus connects the high-voltage accumulator to the body.

The hydraulic mount preferably has a rubber element for configuring a first fluid chamber. The rubber element is in particular hollow and thus encloses the first fluid chamber. It is provided that the first fluid chamber is connected to a second fluid chamber by way of a nozzle plate. It is rendered possible to vary the volume of the first fluid chamber by deforming the rubber element. Fluid from the first fluid chamber can thus be pumped through the nozzle plate into the second fluid chamber. The nozzle plate acts in particular as damping element such that a deformation of the rubber element is able to be dampened. If the rubber element is configured for absorbing the relative movements between the high-voltage accumulator and the body, the relative movement between the high-voltage accumulator and the body can thus be dampened. On account thereof, the force which is to be absorbed by the high-voltage accumulator is reduced.

The rubber element is particularly advantageously connected to the body in a materially integral manner. The rubber element is in particular adhesively bonded to the body. To this end, it is particularly preferably provided that the rubber element for reinforcement has a plate, for example from a metallic material, wherein this plate is connected to the body in a materially integral manner. Fixed linking of the rubber element to the body is achieved on account thereof. A compensation of tolerances while attaching the rubber element to the body is moreover rendered possible on account of the materially integral connection. Alternatively, it is advantageously provided that the rubber element is connected to the body in a force-fitting or form-fitting manner, in particular by way of this plate.

It is furthermore preferably provided that the hydraulic mount has a substructure. The substructure receives a diaphragm and the nozzle plate. The substructure is in particular made from a material which is stiffer than the rubber element, preferably from a metal. The diaphragm serves for configuring the second fluid chamber. The first fluid chamber in terms of the volume thereof can thus be reduced by deformation, wherein the fluid from the first fluid chamber flows into the second fluid chamber which, on account of the diaphragm, can have different volumes. A velocity at which the fluid is to flow between the fluid chambers can be set on account of the nozzle plate which separates the first fluid chamber from the second fluid chamber. The nozzle plate thus serves as a damper. It is provided that the substructure is linked to the high-voltage accumulator. It is thus achieved that the hydraulic mount extends between the high-voltage accumulator and the body. The hydraulic mount can therefore dampen relative movements between the high-voltage accumulator and the body in an optimal manner, on account of which mechanical stress on the high-voltage accumulator is reduced.

The substructure is preferably fixedly connected to the high-voltage accumulator by way of a base plate. This means that the substructure is fastened to the high-voltage accumulator. The base plate is particularly preferably fixedly connected, in particular adhesively bonded or welded, to the substructure. Since a compensation of tolerances takes place already when the hydraulic mount is linked to the body, no compensation of tolerances has to take place while linking by way of the base plate. The linking by way of the base plate is thus implementable in a manner that is simple and of low complexity.

The base plate is particularly advantageously fixedly connected to an external wall of the high-voltage accumulator. The base plate can in particular be fixedly connected to the external wall, for example screwed or riveted to the latter, or in a form-fitting or force-fitting manner. The base plate can also be connected to the external wall in a materially integral manner, for example be welded or adhesively bonded to the latter. In an alternative embodiment, the base plate is part of the external wall of the high-voltage accumulator. This means that the external wall and the base plate are configured in an integral manner. The substructure is thus preferably attached directly to the external wall of the high-voltage accumulator. In any case, it is rendered possible in a manner that is simple and of low complexity that the central connector is initially provided on the high-voltage accumulator and for the central connector is fastened to the body in a subsequent assembly step. The fastening to the body advantageously enables a compensation of tolerances. The central connector can thus be attached in a manner that is simple and of low complexity and can enable the relative movements between the high-voltage accumulator and the body to be dampened in a secure and reliable manner.

The base plate has in particular a compensation bore. A volumetric variation of an intermediate space between the second fluid chamber and the substructure can be compensated by way of the compensation bore. As described above, the substructure preferably has a diaphragm which is provided for delimiting the second fluid chamber. When the second fluid chamber is enlarged on account of the rubber element being compressed, the diaphragm thus extends into the substructure. Ambient air which is displaced from the substructure on account of the volumetric enlargement of the second fluid chamber is in particular present in the substructure. Such a displacement takes place by way of the compensation bore. Likewise, ambient air can flow through the compensation bore into the substructure when the volume of the second fluid chamber is reduced.

A dimension of the hydraulic mount along a vertical axis of the vehicle is preferably at most 60.0 millimeters. The dimension particularly advantageously is at most 22.5 millimeters, in particular at most 15.5 millimeters. It is moreover advantageously provided that a dimension of the hydraulic mount in a plane perpendicular to the vertical axis of the vehicle is at most 200 millimeters, preferably at most 80 millimeters, in particular at most 70 millimeters. The hydraulic mount can thus be attached in a manner that saves installation space. At the same time, a secure and reliable damping of relative movements of the high-voltage accumulator and the body is enabled so as to achieve that the body is supported on the high-voltage accumulator in a manner that is reliable and low in force.

Further details, features, and advantages of the invention are derived from the description hereunder and from the figures.

DETAILED DESCRIPTION OF THE DRAWINGS

Figure 1:
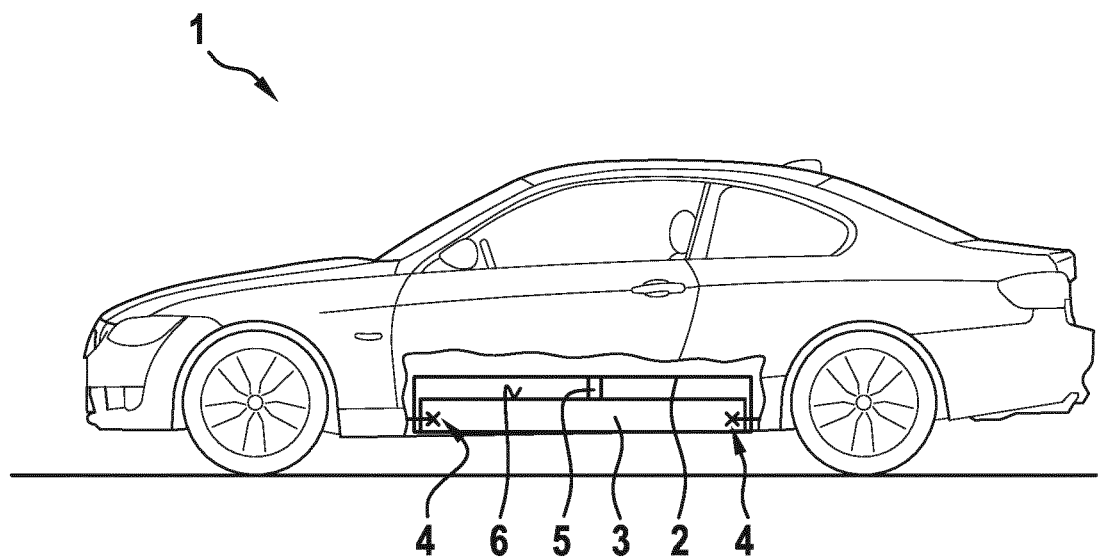
FIG. 1 shows a schematic view of a vehicle according to an exemplary embodiment of the invention.

FIG. 1 schematically shows a vehicle 1 according to an exemplary embodiment of the invention. The vehicle 1 is in particular an electric vehicle or a plug-in hybrid. Vehicle 1 is thus configured for providing electric energy.

The vehicle 1 comprises a body 2 and a high-voltage accumulator 3. The high-voltage accumulator 3 in the peripheral region is fastened to the body 2 by way of fastening elements 4 and is thus fixedly connected to the body 2. The body 2 herein has a cutout in which the high-voltage accumulator 3 is attached. The body is potentially weakened by such a cutout such that support by way of a central connector 5 is advantageous.

The high-voltage accumulator 3 is substantially cuboid. It is provided herein that the largest external faces 6 of the high-voltage accumulator 3 are oriented so as to be perpendicular to a central axis of the vehicle 1. A largest external face 6 is in particular present on an upper side of the high-voltage accumulator 3. The central connector 5 connects the body 2 to this external face 6 of the high-voltage accumulator 3 and thus permits the body 2 to be supported on the high-voltage accumulator 3. The central connector 5 is in particular disposed so as to be centric on the external face 6.

Figure 2:
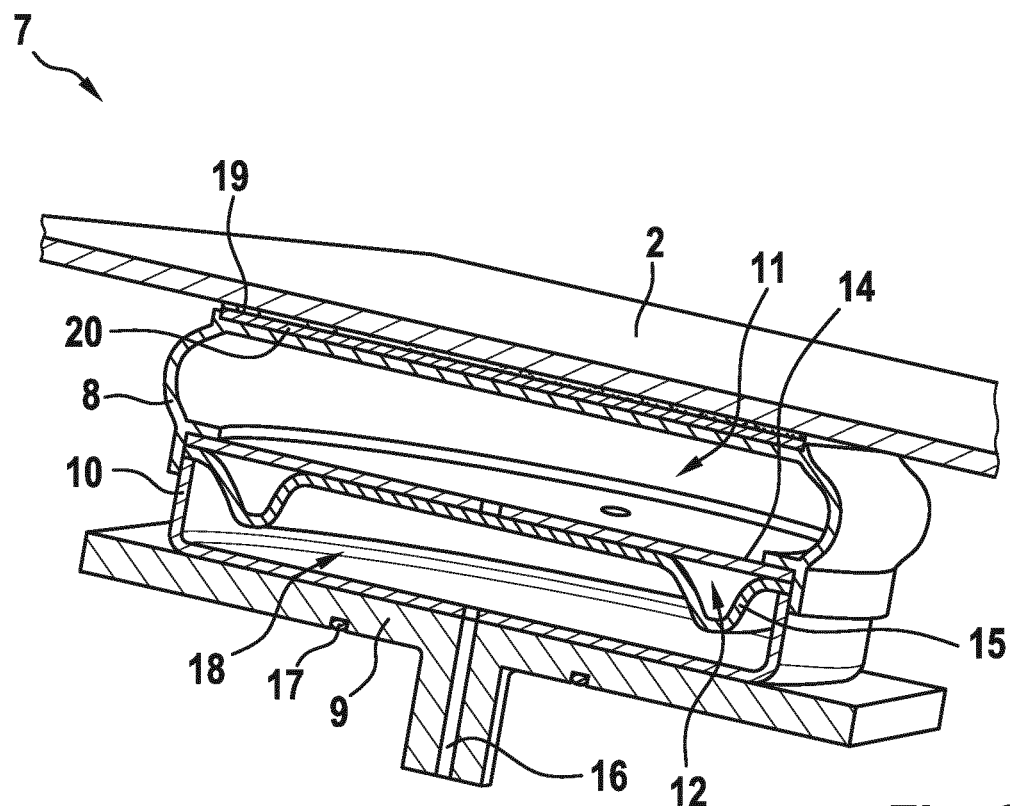
FIG. 2 shows a schematic view of the design of the central connector of the vehicle according to the exemplary embodiment of the invention.
Figure 3:
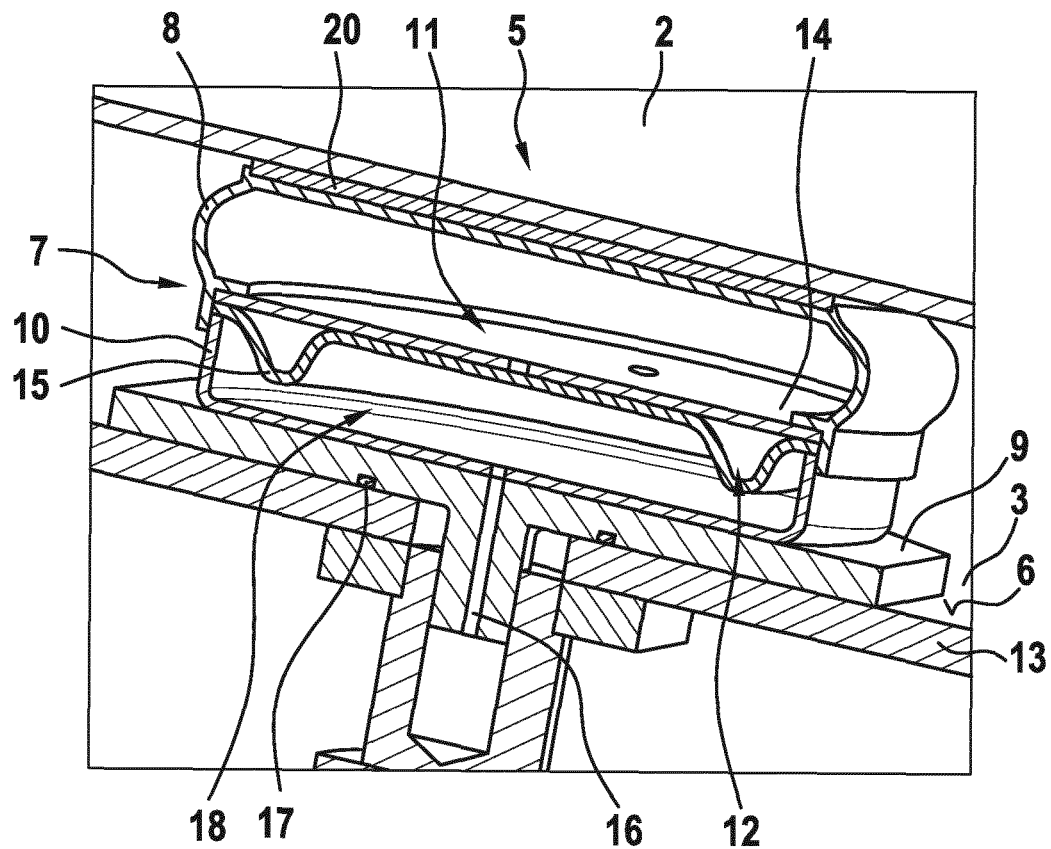
FIG. 3 shows a schematic view of linking the high-voltage accumulator to the body of the vehicle according to the exemplary embodiment of the invention.

FIG. 2 schematically shows the central connector 5 configured as a hydraulic mount 7. FIG. 3 shows a schematic view of the central connector 5 in the installed state between the high-voltage accumulator 3 and the body 2. FIGS. 2 and 3 are therefore conjointly described hereunder.

The hydraulic mount 7 has a base plate 9. The hydraulic mount 7 is linked to the high-voltage accumulator 3 by way of the base plate 9. The base plate 9 is attached to an external wall 13 of the high-voltage accumulator 3 that forms the external face 6. For example, the base plate 9 can be screwed, riveted, or adhesively bonded to the external wall 13. Alternatively, the external wall 13 can be configured so as to be integral to the base plate 9.

A substructure 10 of the hydraulic mount 7 is fixedly attached on the base plate 9. The substructure 10 is in particular made from metal or from plastics material and is connected to the base plate 9 in a materially integral, form-fitting and/or friction-fitting manner. The substructure 10 serves for receiving a diaphragm 15 and a nozzle plate 14. A rubber element 8 is moreover attached to the nozzle plate 14.

The rubber element 8 is configured so as to be hollow, in particular in the shape of a pot, and conjointly with the nozzle plate 14 delimits a first fluid chamber 11. A second fluid chamber 12 is preferably delimited by the nozzle plate 14 and the diaphragm 15. The nozzle plate 14 comprises at least one opening in order for the first fluid chamber 11 to be connected to the second fluid chamber 12. A flow rate at which the fluid from the first fluid chamber 11 can flow to the second fluid chamber 12, or vice versa, is thus able to be adjusted by way of the nozzle plate 14. The flow rates for the two directions herein do not mandatorily have to be identical.

The rubber element 8 is connected to the body 2 in a materially integral manner. An adhesive 19 is in particular used for linking the rubber element 8 to the body 2. The rubber element 8 is thus fixedly connected to the body 2. The rubber element 8 particularly advantageously has a plate 20 in order to achieve a reinforcement. The adhesive 19 is advantageously applied to the plate 20. Alternatively, the plate 20 can also be connected to the body 2 in a force-fitting manner, for example screwed to the latter, or in a form-fitting manner.

If there is any relative movement between the body 2, which is connected to the rubber element 8, and the high-voltage accumulator 3, which is connected to the substructure 10, a deformation of the rubber element 8 will thus take place. A volume of the first fluid chamber 11 is varied on account thereof, on account of which fluid is either forced into the second fluid chamber 12 or suctioned from the second fluid chamber 12. The nozzle plate 14 acts as a damping element in that the flow rate of the fluid from or into the first fluid chamber 11 is restricted. Damping of the relative movement thus takes place. At the same time, linking the body 2 to the high-voltage accumulator 3 is implemented.

The second fluid chamber 12 serves as compensation for the deformation of the rubber element 8 and thus of the variation of the volume of the first fluid chamber 11. On account of the diaphragm 15 the second fluid chamber 12 can extend into the substructure 10 or retract from the substructure 10. An intermediate space 18 between the substructure 10 and the second fluid chamber 12 is filled with ambient air. In order for a compensation of the intermediate space 18 to also be enabled in a volumetric variation of the second fluid chamber 12, the base plate has a compensation bore 16 for discharging the ambient air from the intermediate space 18 or for supplying the ambient air to the intermediate space 18.

When the rubber element 8 is adhesively bonded to the body 2, a compensation of tolerances in a direction perpendicular to a vertical axis of the vehicle 1 is in particular enabled. This is achieved in particular by a free positioning capability of the adhesive connection between the body 2 and the rubber element 8. A compensation of tolerances in a manner parallel to the vertical axis is moreover enabled in that a deformation of the rubber element 8 takes place. Secure and reliable linking of the hydraulic mount 7 to the body 2 and to the high-voltage accumulator 3 is thus achieved.

Relative movements between the high-voltage accumulator 3 and the body 2 can be dampened in an optimal manner on account of the hydraulic mount 7. Shear forces and vibrations can in particular be dampened. At the same time, the body 2 can be reliably supported on the high-voltage accumulator 3.

The hydraulic mount 7 moreover has a seal 17 on the base plate 9. The hydraulic mount 7 can then be sealed in relation to the high-voltage accumulator 3.

A dimension of the hydraulic mount 7 along a vertical axis of the vehicle 1 is preferably at most 60.0 millimeters or at most 22.5 millimeters or at most 15.5 millimeters. Moreover, a dimension of the hydraulic mount 7 in a plane perpendicular to the vertical axis of the vehicle 1 is at most 200 millimeters or at most 80 millimeters or at most 70 millimeters. The hydraulic mount 7 can thus be attached in a manner that saves installation space. At the same time, a secure and reliable damping of relative movements between the high-voltage accumulator 3 and the body 2 is enabled so as to achieve that the body 2 is supported on the high-voltage accumulator 3 in a manner that is reliable and low in force.

LIST OF REFERENCE SIGNS

1 Vehicle
2 Body
3 High-voltage accumulator
4 Fastening element
5 Central connector
6 External face
7 Hydraulic mount
8 Rubber element
9 Base plate
10 Substructure
11 First fluid chamber
12 Second fluid chamber
13 External wall
14 Nozzle plate
15 Diaphragm
16 Compensation bore
17 Seal
18 Intermediate space
19 Adhesive
20 Plate

What is claimed is:

1. A vehicle, comprising:
a body;
a high-voltage accumulator which is attached to the body by way of fastening elements; and
at least one central connector which differs from the fastening elements and which, for supporting the body, is configured on the high-voltage accumulator, wherein:
the central connector is a hydraulic mount which extends between the body and the high-voltage accumulator,
the hydraulic mount has a rubber element for configuring a first fluid chamber, and
the rubber element has an entirely planar metallic plate that is connected in a materially integral, form-fitting and/or force-fitting manner to a planar surface of the body.

2. The vehicle according to claim 1, wherein the central connector is disposed on a largest external face of the high-voltage accumulator.

3. The vehicle according to claim 1, wherein the central connector is disposed centrally on a largest external face of the high-voltage accumulator.

4. The vehicle according to claim 1, wherein the first fluid chamber is connected to a second fluid chamber by way of a nozzle plate.

5. The vehicle according to claim 1, wherein the rubber element is adhesively bonded to the body.

6. The vehicle according to claim 4, wherein
the hydraulic mount has a substructure that receives a diaphragm and the nozzle plate,
the diaphragm forms the second fluid chamber which is separated from the first fluid chamber by the nozzle plate, and
the substructure is linked to the high-voltage accumulator.

7. The vehicle according to claim 6, wherein
the substructure is fixedly connected to the high-voltage accumulator by way of a base plate.

8. The vehicle according to claim 7, wherein
the base plate is fixedly connected to an external wall of the high-voltage accumulator, or is part of the external wall of the high-voltage accumulator.

9. The vehicle according to claim 7, wherein
the base plate has a compensation bore by way of which a volumetric variation of an intermediate space between the second fluid chamber and the substructure is compensated.

10. The vehicle according to claim 1, wherein
a dimension of the hydraulic mount along a vertical axis of the vehicle is at most 60.0 millimeters.

11. The vehicle according to claim 1, wherein
a dimension of the hydraulic mount along a vertical axis of the vehicle is at most 22.5 millimeters.

12. The vehicle according to claim 1, wherein
a dimension of the hydraulic mount along a vertical axis of the vehicle is at most 15.5 millimeters.

13. The vehicle according to claim 1, wherein
a dimension of the hydraulic mount in a plane perpendicular to a vertical axis of the vehicle is at most 200 millimeters.

14. The vehicle according to claim 1, wherein
a dimension of the hydraulic mount in a plane perpendicular to a vertical axis of the vehicle is at most 80 millimeters.

15. The vehicle according to claim 1, wherein
a dimension of the hydraulic mount in a plane perpendicular to a vertical axis of the vehicle is at most 70 millimeters.

* * * * *